United States Patent [19]
Frantz

[11] Patent Number: 5,937,386
[45] Date of Patent: Aug. 10, 1999

[54] COMPUTERIZED METHOD AND SYSTEM FOR FULFILLMENT OF AN ITEMIZED FOOD ORDER FROM A QUICK-SERVICE RESTAURANT MENU

[76] Inventor: Howard J. Frantz, 31 Whitewood, Irvine, Calif. 92714

[21] Appl. No.: 08/762,038

[22] Filed: Dec. 9, 1996

[51] Int. Cl.⁶ .................................. G06F 153/00
[52] U.S. Cl. .................. 705/1; 705/15; 705/16; 705/23
[58] Field of Search ................. 705/1, 15, 18, 705/23; 379/159; 141/1

[56] References Cited

U.S. PATENT DOCUMENTS

| 5,353,847 | 10/1994 | Cahlander et al. | 141/1 |
| 5,510,979 | 4/1996 | Moderi et al. | 705/18 |
| 5,602,730 | 2/1997 | Coleman et al. | 705/15 |
| 5,644,630 | 7/1997 | Durco, Jr. | 379/159 |

FOREIGN PATENT DOCUMENTS 0055309  7/1982  United Kingdom ............. B65B 1/32

*Primary Examiner*—Allen R. Macdonald
*Assistant Examiner*—M. Irshadullah
*Attorney, Agent, or Firm*—Daniel Abraham

[57] ABSTRACT

This present invention comprises an apparatus and method for checking the accuracy of a customer's food order when ordering food to go from a quick-service restaurant. This is done by checking the contents of a bagged order by means of a weight check of the total weight of the bagged order so as to determine the correct order and/or contents thereof prior to the customer leaving the quick service restaurant. Accordingly, the order is logged into a computer system that is programmed to check the contents of the order by means of weighing the total items packaged in the bag, whereby the restaurant employee is alerted when the bagged order is either overweight or underweight with respect to the actual predetermined weight of the total items ordered.

20 Claims, 1 Drawing Sheet

COMPUTERIZED METHOD AND SYSTEM FOR FULFILLMENT OF AN ITEMIZED FOOD ORDER FROM A QUICK-SERVICE RESTAURANT MENU

BACKGROUND OF THE INVENTION

1. Field of the Invention

This invention relates generally to a weight check of a customer's order at a quick-service restaurant, and more particularly to a system for checking the contents of a bagged order to determine if it is correct. The order is input into a computer system that is adapted to check for the correct food content by means of weighing the bagged order. The restaurant personnel are alerted by the computer system when the packaged order is either overweight or underweight when compared to a predetermined weight range for the total items ordered.

2. Description of the Prior Art

As is well known in the Quick Service Restaurant (QSR) industry there are major problems which exist in properly filling customer orders. Such problems may include one or more of the following most common mistakes made when preparing and filling an order such as:

- missing items—(such as forgetting to add fries to the bag);
- wrong items from those ordered;
- handing out the wrong order to the customer.

Because drive-thru and to-go orders are typically served in non-transparent containers, which are most commonly bags, the inaccuracy of the food handed out may not be obvious to either the customer or the store associate. Further complicating this issue is that the majority of drive-thru customers leave the restaurant premises before inspecting the order. This makes the inaccuracy of drive-thru orders very difficult to correct and very aggravating for the customers.

In a typical quick-service restaurant orders are received and entered into a Point-of-Sale (POS) register. This register is linked to a potentially complex network of registers, monitors, bump bars, printers, and processors called a "POS System". This system is driven by specialized software packages that route and track orders, send messages to peripheral equipment, and compile statistics.

Current POS software packages allow great flexibility and drive specialized hardware. Much effort has gone into using this flexibility to develop new applications to enhance this system. Examples include automatic change making machines, ATMs and automated drink makers. However, the present invention is designed to provide a new and unique application for this environment.

SUMMARY AND OBJECTS OF THE INVENTION

The present invention comprises a Point-Of-Sale Register by which the order is input, sent to a computer, and logged in the various programs of the processor. At the same time the order is sent to a monitor or monitors located in the food preparation area. The food is prepared and bagged, and is then placed in a queue on a counter until it can be transferred and placed on a suitable electronic scale where the order is weighed. The resultant weight is electronically transmitted to the processor and is loaded in a program which compares the actual Weight vs. Target Weight Ranges, and is at the same time loaded in a Compile Order Accuracy Status Program.

If the weight is within an acceptable range a message is sent to the monitor or monitors, wherein the display indicated by a suitable recognizable means, such as the use of text or a green light. This information is also sent to the Compile Order Accuracy Status Program.

If, however, the calculated weight of the order is determined to be in a borderline area the monitor will display a message, either by text or as an example a yellow light, and this is also sent to Compile Order Accuracy Status Program. This message indicates that the order is slightly outside the acceptable range and should be checked before it is handed out to the customer.

If the calculated weight of the order is determined to be outside the acceptable and borderline ranges, then a message is sent to the monitor and to Compile Order Accuracy Status Program indicating that it should be thoroughly rechecked for accuracy as to the specific order and should not be handed out without corrective action.

Thus, the present invention has for an important object to provide a means that will overcome the inaccurate filling of orders in quick service restaurants by employing a weight checking apparatus and method, wherein each distinct food item and size thereof is established by a predetermined weight factor that can be readily analyzed by weighing the total contents of a complete packaged order so as to readily determine and recognize that the order has been properly packaged within a given total weight range.

Another object of the present invention is to provide a weight check of the customer's order, whereby a completed order is weighed to determine by the present method to be according to one of three standards, that is, an acceptable range, borderline range or an unacceptable range requiring that the order be checked for its contents.

Still another object of the invention is to provide a method and apparatus of this character that will prevent placing a wrong item in the bag of an outgoing order, giving an incomplete order to a customer or having a customer receive another person's order.

A further object of the present invention is to provide an apparatus and method of the character herein disclosed that is simple to install, operate, service and maintain.

Still a further object of the present invention is to provide a drive-thru weight check system that establishes a means to detect order inaccuracy quickly without extra handling, and with a small investment.

The various features of novelty which characterize the invention are pointed out with particularity in the claims annexed to and forming a part of this disclosure. For a better understanding of the invention, its operating advantages by its use, reference should be had to the accompanying drawing and descriptive matter.

BRIEF DESCRIPTION OF THE DRAWING

The drawing is a diagrammatic layout of the present invention.

DESCRIPTION OF THE PREFERRED EMBODIMENT

Figure 1:
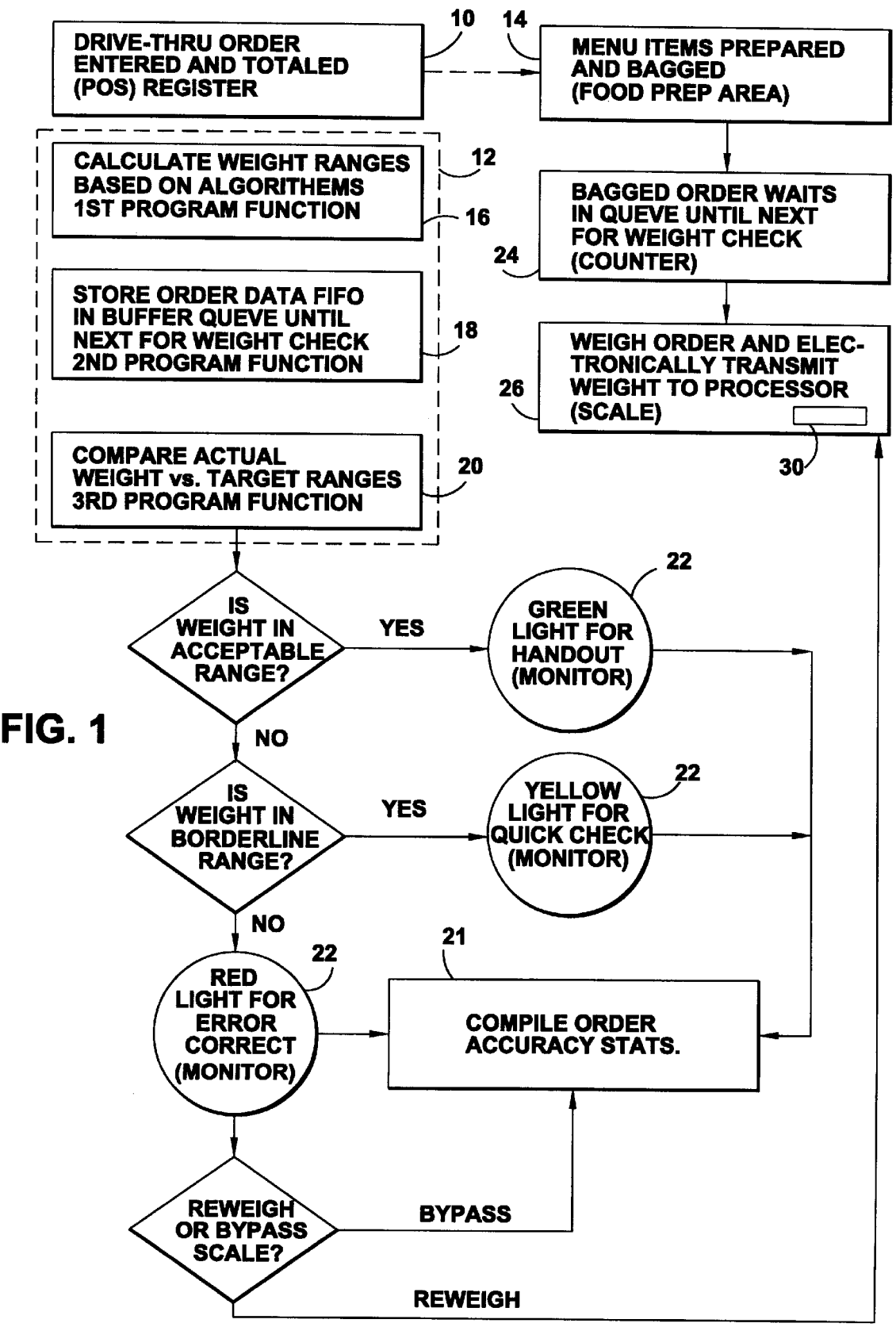

Referring more particularly to the drawing, there is shown a schematic diagram with Point-Of-Sale (POS) register, generally indicated at 10. This diagram refers to the drive-thru operation of a QSR, however, it should be noted that the hereinafter described invention can be useful in other business applications where carry-out orders are provided.

Accordingly, the present invention comprises the (POS) register 10 which allows a drive-thru order to be entered by an employee. As the order is entered in the register it is sent to one or more main stations. The first main station is defined by a computer means 12 or a POS network of computers, and the second main station is located where the menu items are prepared and bagged for the customer, which is referred to as the food-prep area, indicated at 14, whereby orders are entered into the computer and are logged in a first program function 16 designed to calculate the weight and range of each and every standard food item including drinks and food items that are custom-ordered, such as lettuce, tomatoes and condiments that might be added or removed. Each food item has a weight specification associated with it which may be altered by any associated modifier. The weight specification may be expressed in one of many forms:

a specific number (i.e. 4 oz.)

a range (i.e. 3.5–4.5 oz.)

a distribution (i.e. normal distribution with an average of 4 oz. and standard deviation of 0.2 oz.)

The method by which the weight specification is expressed will be a function of the characteristics of the item and the algorithm used for calculating total order weight and acceptance ranges. This may vary in different (QSR) environments. The weight specifications are stored in the data base of the (POS) System.

Thus, the first program function 16 includes a program that calculates the target weight and acceptance ranges for the entire order or suborder. This requires several steps:

a) Determine the full list of items to be included in the weight total. Typically drinks would be excluded. The addition or elimination of items such as ketchup packets, napkins and bag weight may be included. Characteristically, the (QSR) has standards which dictate the exact condiments and packaging based on the contents of the order. That is, 2 napkins per burger, 1 ketchup packet per fry, 3 items per #10 bag, etc.

b) Calculate the target weight and acceptable range for the order or suborder. There are multiple algorithms that can be used. The exact algorithm would be a function of the characteristics of the menu and the specific items. The target and range may be based on empirical data or theoretical statistics.

In general the algorithm will result in the calculation of:

Target weight (i.e. 32 oz.) which is the sum of the target weight of the individual items.

An acceptable range around the target weight which may be based on either empirical data or theoretical statistics (i.e.—measures of dispersion, the central limit theorem).

The acceptance range could be tempered by the operational desire of the management; for example, a restaurant concerned about shorting orders would have tighter tolerances for underweight orders than a restaurant concerned about over-portioning.

A second program function, indicated at 18, which is arranged to store data received from each individual order that is transmitted by the register. The orders are stored in a buffer in first in/first out (FIFO) order..

A third program function, generally indicated at 20, includes a program that compares the actual weight of a completed order to the target ranges as defined in the program function 16 and is referred to as Compare Actual Weight vs. Target Ranges..

As the order comes in it is sent simultaneously to a monitor or monitors in the food prep area defined as a first station 14, where the menu items are displayed for preparation and bagging according to the particular menu displayed for the order. After the order is bagged it is placed at a first substation 24, which is defined as a counter where the order is put in the (FIFO) waiting queue, whereby each order is sequentially moved in turn to be weight checked.

A second substation or area 26 is provided which is referred to as "Weigh Order And Electronically Transmit Weight To Processor", which is defined by a weighing means, generally indicated at 26, and is further defined as a suitable electronic scale that is adapted to electronically transmit the precise combined weight of each item stored in the bag being weighed. "The determined weight is sent to the computer and logged into program function 20."

When the weight of the order, which we will call "order A", is determined by the weighing at the scale it is sent back to the program stored in program function 20 where the actual weight of the particular "order A" is compared to the target range for that particular order, "order A", as calculated in program function 16. If the program is within an acceptable range an acceptable message is sent to the respective monitor or monitors in one of any suitable arrangements, either in text form, color, etc., that is simple and compatible with a particular operation within the quick-service restaurant. At the same time the acceptance information generated by the program function 20 is transferred to a memory program referred to as "Compile Order Accuracy Status" based in program function 21 and is recorded to provide a later summary trend analysis.

If, however, the weight of "order A" indicates a "borderline" weight condition, which indicates a potential error, a warning message is displayed on the monitor. At this time the store associate should give "order A" a quick visual check and correct any errors within the bag. The weight is recorded for summary trend analysis.

If, however, there is an out-of-specification weight condition, wherein the weight is indicated as being outside of the acceptance range and borderline range with a high probability that there is an incorrect order, an error message is displayed at the respective stations. This indicates that the order must be checked, corrected and reweighed. The final weight is recorded for summary trend analysis.

Each area or substation station is provided feed back means comprising a bump bar 30 that allows the assigned associate to input simple commands back into the POS System when necessary. Most quick service restaurants have bump bars and display monitors in the drive-thru handout area. Depending on the restaurant configuration, the drive-thru weight check may be integrated to use an existing display monitor and bump bar. The feedback means would be customized to meet the operational needs of the restaurant and would include a skip function so as to bypass an order and skip to the next order. It would be also provided with a recall function whereby a previous order can be rechecked or the order can be accepted with an override system to accept an order having an out-of-specification weight without correction.

Included within the program function 21 is a means by which all related collected data can be adapted to provide and generate customized management reports to track weight trends and identify trends in under/over portioning. The reports could also identify adherence to packaging and condiment standards.

The foregoing is a description of a preferred embodiment of the invention which is given herein by way of example only. The invention is not to be taken as limited in any of the specific features as described, but comprehends all such variations thereof as come within the scope of the appended claims.

What I claim is:

1. An apparatus for checking order fulfillment of bagged food items in a quick-service restaurant, said apparatus comprising:

a Point-of-Sale system which substantially includes a register means, wherein a food order comprising different menu items selected by a customer is electronically sent to a first station defined by at least one computer having at least one monitor and a second main station defined as a food prep area having a weighing means, whereby the ordered food items are prepared, bagged and weighed, said second station connected to transmit weight information to the computer;

said computer comprising a first program function to calculate a total target weight specification for the ordered food items based on weight specifications for each of the ordered food items;

said computer comprising a second program function whereby the food order data and corresponding target weight specification are stored in a memory; and said computer comprising a third program function to compare the target weight specification of the ordered food items to the total weight of the bagged food items to verify that the food order is properly filled before being given to the customer.

2. The apparatus as recited in claim 1, wherein said register means is defined as a point-of-sale register, whereby food items ordered entered therein are transmitted to the respective stations.

3. The apparatus as recited in claim 2, wherein said food prep area includes:

a first substation wherein the bagged orders are placed in a waiting queue, whereby each order is sequentially moved in turn to be weighed; and a second substation wherein each order is sequentially received from said first station and weighed on said weighing means, whereby the resultant weight of said order is transmitted to the computer.

4. The apparatus as recited in claim 3, wherein said weighing means comprises an electronic scale.

5. The apparatus as recited in claim 3 wherein:

said first program function calculates the total target weight specification for the ordered food item based on predetermined weight specifications of each ordered food item;

said second program function stores the data of each sequential order that is placed through said point-of-sale register; and said third program function compares the actual weight of the bagged order versus the target weight to determine whether the weight of the bagged order is within an acceptable range, a borderline range or an unacceptable range, whereby the selected weight range is transmitted to and displayed on said monitor.

6. The apparatus as recited in claim 5, including a bump bar, whereby commands can be transmitted back to said point-of-sale register when an order is to be reweighed or bypassed when an order is required to be rechecked.

7. The apparatus as recited in claim 6, including a processor wherein respective data of all orders are collected and compiled, whereby management reports to track weight trends and identify trends in under/over portioning can be generated.

8. A method of checking the contents of a bagged food order by means of weighing a given order of bagged food items in a quick-service restaurant prior to bagged food being given to the customer comprising the steps of:

entering an itemized food order comprising different menu items into a register means;

transmitting said food order from said register means to a first main station defined as a computer and simultaneously sending said food order to a second main station defined as a food preparing station where the food is prepared and bagged;

weighing the bagged food order on a weighing means to determine the total weight of all the items bagged;

transmitting the determined total weight of the order to said computer;

comparing the actual total weight of the bagged food items in the order with the total combined acceptable weight range calculated by said computer;

determining one of three weight ranges the bagged food order corresponds to, wherein the three ranges consist of an acceptable range, a borderline range or an unacceptable range requiring that the contents of the bagged be rechecked;

transmitting the selected range to at least one monitor to notify, to the register means and said first and second main station prior to the bagged food order being given to the customer.

9. The method as recited in claim 8, wherein said computer includes the step of providing at least one processor and a plurality of programs in which there is provided a program to calculate the weight ranges based on algorithms, a program to store data to determine first in/first out buffer in a sequential queue until the next in-line food order weight check, and a program to compare actual weight versus a plurality of target ranges.

10. The methods as recited in claim 9, wherein said computer includes the step of providing a program that compiles order accuracy statements for all combined orders received from the programs, whereby management reports to track trends and identify trends in under/over positioning can be generated.

11. The method as recited in claim 10, wherein said weighing means comprises an electronic scale.

12. The method as recited in claim 10, including the step providing feedback means comprising a bump bar that allows an assigned employee to input simple commands back into a Point-Of-Sales system to allow various functions to be skipped or added and to bypass an order and skip to the next order.

13. The method as recited in claim 8, wherein said computer includes the steps of:

providing a first program function having a program that calculates the weight range of each order based on algorithms, a program function having a program that stores the data of each sequential order that is placed through said register means, and a third program function having a program that compares the actual weight of the order versus the target ranges that define whether the weight of the order is within an acceptable range, a borderline range or an unacceptable range, whereby the selected weight range is transmitted to and displayed on said monitor.

14. The method as recited in claim 13, wherein said register means is defined as a point-of-sale register.

15. A system for checking order fulfillment in a quick-service restaurant comprising:

a Point-of-Sale (POS) register for entering a food order, wherein said food order comprises a selection of different menu items, said POS register connected to transmit the food order to a first station comprising a computer and to a second station comprising a food preparation area;

said second station comprising a food preparation area whereby the food order is prepared and bagged and a scale whereby the bagged order is weighed, said measured weight being sent to the computer; and said first station comprising the computer connected to receive said food order from the POS register, said computer comprising a first program function that determines an associated weight specification for the food order based on predetermined associated weight specifications for the different menu items comprising the food order, said computer comprising a second program function that stores the weight specification along with the order information, and said computer comprising a third program function that compares the weight specification of the food order with a measured weight of the food order, thereby checking order fulfillment prior to order delivery.

16. The system of claim 15 wherein said predetermined associated weight specifications comprise an average weight and acceptable deviation for each food item on the menu.

17. The system of claim 15 wherein the associated weight specification for the food order comprises a target weight and an acceptable range around the target weight wherein the food order would be considered fulfilled.

18. The system of claim 15 further comprising a visual check of a bagged food order whose weight lies outside an associated acceptable range.

19. The system of claim 15 further comprising a program function that compiles order accuracy statistics.

20. The system of claim 15 wherein prepared and bagged food orders are placed in a FIFO waiting queue for weight checking and the associated weight specifications are stored in a FIFO memory.

* * * * *